(12) United States Patent
Pedersen et al.

(10) Patent No.: US 12,543,007 B2
(45) Date of Patent: Feb. 3, 2026

(54) METHOD FOR MONITORING AND DETECTING IF HEARING INSTRUMENTS ARE CORRECTLY MOUNTED

(71) Applicant: Oticon A/S, Smørum (DK)

(72) Inventors: Michael Syskind Pedersen, Smørum (DK); Amalie Sofie Ekstrand, København (DK); Mette Carstensen, Smørum (DK); Nicolai Westergren, Smørum (DK); Tanveer Bhuiyan, Smørum (DK); Sudershan Yalgalwadi Sreepadarao, Smørum (DK); Elvira Fischer, Smørum (DK)

(73) Assignee: Oticon A/S, Smørum (DK)

( * ) Notice: Subject to any disclaimer, the term of this patent is extended or adjusted under 35 U.S.C. 154(b) by 355 days.

(21) Appl. No.: 18/093,727

(22) Filed: Jan. 5, 2023

(65) Prior Publication Data

US 2023/0217193 A1   Jul. 6, 2023

(30) Foreign Application Priority Data

Jan. 6, 2022   (EP) .................................. 22150462

(51) Int. Cl.
*H04R 25/00*   (2006.01)
*G01P 15/18*   (2013.01)

(52) U.S. Cl.
CPC .............. *H04R 25/30* (2013.01); *G01P 15/18* (2013.01); *H04R 25/552* (2013.01); *H04R 2225/021* (2013.01); *H04R 2225/61* (2013.01)

(58) Field of Classification Search
CPC .... H04R 25/30; H04R 25/552; H04R 25/609; H04R 2225/021; H04R 2225/61;
(Continued)

(56) References Cited

U.S. PATENT DOCUMENTS 10,880,655 B2 * 12/2020 Kukla ................ G08B 21/0446
2013/0188796 A1    7/2013 Kristensen et al.
(Continued)

FOREIGN PATENT DOCUMENTS

EP    3 313 098 A2    4/2018
EP    3 313 098 A3    5/2018
(Continued)

OTHER PUBLICATIONS

"Correlation—Wikipedia", Jan. 2, 2022, XP055933008, https://web.archive.org/web/20220102052647/https://en.wikipedia.org/wiki/Correlation, [retrieved on Jun. 20, 2022], pp. 1-13.
(Continued)

*Primary Examiner* — Ahmad F. Matar
*Assistant Examiner* — Sabrina Diaz
(74) *Attorney, Agent, or Firm* — Birch, Stewart, Kolasch & Birch, LLP

(57) ABSTRACT

A binaural hearing aid system comprises left and right hearing instruments each comprising a BTE-part comprising a housing configured to be located at or behind an outer ear of the user and an acceleration sensor configured to measure acceleration in at least two directions relative to the housing of the BTE-part and to provide acceleration data indicative thereof. A first one of the left and right hearing instruments comprises a transmitter configured to transmit said acceleration data to the other hearing instrument, and the other hearing instrument comprises a receiver for receiving said acceleration data from the first one of the hearing instruments. The other hearing instrument further comprises a controller for detecting whether or not the left and right hearing instruments are correctly mounted in dependence of a similarity measure between said acceleration data provided by the left and right hearing instruments. A method of operating a binaural hearing aid system is further disclosed.

19 Claims, 10 Drawing Sheets

(58) Field of Classification Search
CPC .... H04R 1/1008; H04R 1/105; H04R 1/1016; G01P 15/18
USPC ................................ 381/23.1, 330, 328, 322
See application file for complete search history.

(56) References Cited

U.S. PATENT DOCUMENTS

| | | | |
|---|---|---|---|
| 2019/0297431 A1* | 9/2019 | Oesch | H04R 25/554 |
| 2020/0077204 A1 | 3/2020 | Pedersen et al. | |
| 2021/0360354 A1 | 11/2021 | Rasmussen et al. | |

FOREIGN PATENT DOCUMENTS

| | | | | |
|---|---|---|---|---|
| EP | 3 370 435 A1 | | 9/2018 | |
| EP | 3 709 131 A1 | | 9/2020 | |
| EP | 3565276 B1 * | | 8/2021 | ............. H04R 25/00 |
| EP | 4 033 784 A1 | | 7/2022 | |
| WO | WO-2021080171 A1 * | | 4/2021 | ............... H04R 1/10 |

OTHER PUBLICATIONS

"Cross-covariance matrix", Jun. 12, 2021, XP055933432, https://web.archive.org/web/20210612185358/https://en.wikipedia.org/wiki/Cross-covariance_ matrix, [retrieved on Jun. 21, 2022], pp. 1-2.
Extended European Search Report issued in Application No. 22150462.4 dated Jun. 29, 2022.

* cited by examiner

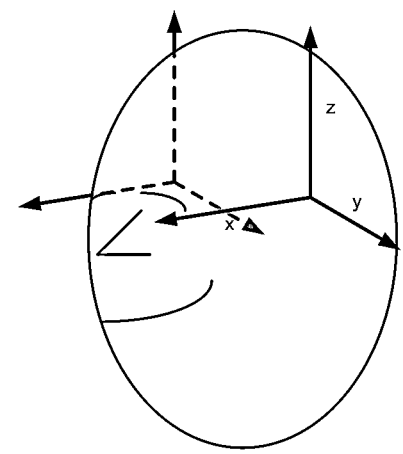 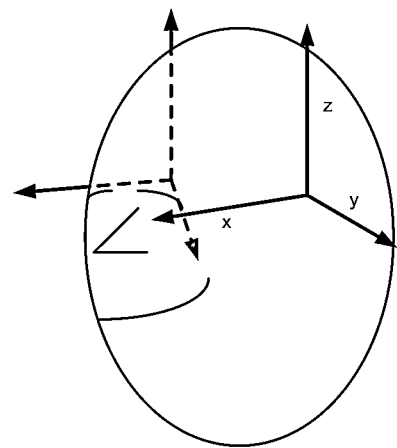
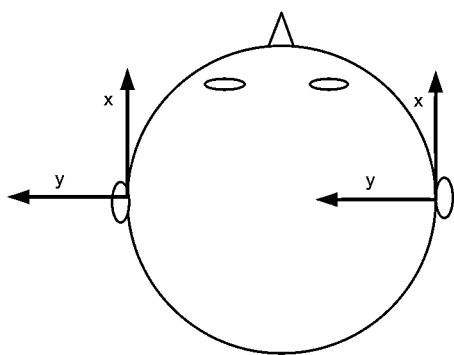 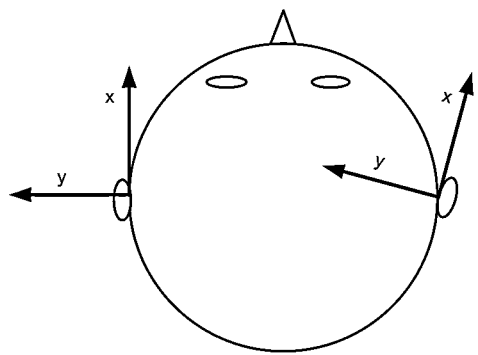
FIG. 2A	FIG. 2B

METHOD FOR MONITORING AND DETECTING IF HEARING INSTRUMENTS ARE CORRECTLY MOUNTED

TECHNICAL FIELD

The present disclosure relates to the field of hearing devices, e.g. hearing aids or headsets/head phones, configured to be worn at one or more ears of a user. The present relates in particular to a scheme for detecting whether or not the hearing device (or hearing devise) are correctly mounted at the ear (or ears) of the user.

US2013188796A1 teaches that a leakage can be detected in a hearing aid, if the current feedback path differs from a reference feedback path. Hereby, it is detected that an earmold of the hearing aid is not correctly mounted. EP3370435A1 deals with optimized mounting of a hearing aid device using an accelerometer.

SUMMARY

However, in order to provide the best possible hearing loss compensation and noise reduction, not only the earmold has to be correctly mounted. Also, a behind the ear (BTE) part of the hearing aid should be correctly positioned at or behind the ear (pinna). This is illustrated in FIG. 1, where it is shown that one of the hearing instruments of a binaural hearing aid system is hanging from the ear rather than being correctly positioned behind the ear.

A Hearing Aid:

In an aspect of the present application, a binaural hearing aid system comprising left and right hearing instruments adapted to be located at or in left and right ears, respectively, of a user, is provided. Each of the left and right hearing instruments comprises a BTE-part configured to be located at or behind an outer ear of the user, the BTE-part comprising a housing;

an acceleration sensor configured to measure acceleration in at least two directions relative to the housing of the BTE-part and to provide acceleration data indicative thereof.

At least a first one of the left and right hearing instruments may comprise a transmitter being configured to allow transmission of acceleration data from the acceleration sensor to the second one of the left and right hearing instruments. At least a second one of the left and right hearing instruments may comprise a receiver being configured to allow reception of the acceleration data from the acceleration sensor of the first one of the left and right hearing instruments. At least the second one of the left and right hearing instruments may comprise a controller configured to detect whether or not the left and right hearing instruments are correctly mounted in dependence of a similarity measure (e.g. a correlation measure) between said acceleration data provided by the left and right hearing instruments.

A detection of whether or not the left and right hearing instruments are correctly mounted may e.g. be based on an evaluation of a similarity of the movement- (e.g. acceleration-) patterns between left and right hearing instruments.

Thereby an improved binaural hearing aid system may be provided.

The outer ear is typically termed 'pinna'.

'The left and right hearing instruments being adapted to be located at or in left and right ears, respectively,' may comprise that left and right hearing instruments each comprise information indicating its intended assignment as a 'left' of 'right' hearing instrument. The hearing aid system may be configured to allow the controller access to the information indicating the intended assignment of a given one of the left and right hearing instruments as a 'left' of 'right' hearing instrument.

The controller may be configured to compare the acceleration data of the left and right hearing instruments. The controller may be configured to detect whether the left and right hearing instruments are correctly mounted in dependence of the comparison of the acceleration data of the left and right hearing instruments.

Each or the left and right hearing instruments may comprise a two-dimensional (2D), or a three-dimensional (3D), acceleration sensor, configured to provide respective measures of acceleration in two (2D-sensor) or three (3D-sensor) directions relative to the housing of the BTE-part. The acceleration data may be represented by 2D or 3D vectors ($a_L=[x_L, y_L]$ and $a_R=[x_R, y_R]$ or $a_L=[x_L, y_L, z_L]$ and $a_R=[x_R, y_R, z_R]$) from the left and right hearing instruments, respectively. The elements (e.g. $x_L$, $y_L$, $z_L$) of the acceleration vectors (e.g. $a_L$) may be denoted acceleration signals (e.g. $x_L$, $y_L$, $z_L$), each acceleration signal representing acceleration data from a given (e.g. 2D- or 3D-) acceleration sensor in a given direction. In the 2D case, the direction of gravity and the direction orthogonal to the head may e.g. constitute preferred directions (of acceleration). This may e.g. be used in case you only have acceleration data in two directions to decide along which axes you should measure acceleration (e.g. during a correct placement of the hearing instruments at the ears of the user).

To save computations (and hence power), it may be advantageous to dispense with processing acceleration data from the axis that most frequently is parallel with the direction of gravity. In such case, the cross-covariance may be calculated directly from the acceleration signals (($a_L$, $a_R$), since the average value of the two other axes will be zero).

Each of the left and right hearing instruments may be configured to allow an exchange of acceleration data from the acceleration sensor to the respective left and right hearing instruments between them. The acceleration data may be pre-processed before exchanged between the left and right instruments. The pre-processing may e.g. include low-pass filtering and/or down-sampling.

A criterion for detecting whether or not the left and right hearing instruments are correctly mounted may be based on a comparison of (e.g. a difference between) acceleration patterns of the left and right hearing instruments. If the difference is large (e.g. above a (first) threshold value), e.g. over a predefined time, it may be taken to be an indication the instruments are not correctly mounted.

The similarity measure may be constituted by or comprise a correlation measure.

Each of the left and right hearing instruments may comprise a controller configured to detect whether or not the left and right hearing instruments are correctly mounted in dependence of a correlation measure, e.g. a correlation between corresponding measures of acceleration in two (2D-sensor, e.g. x, y) or three (3D-sensor, e.g. x, y, z) directions relative to the housing of the BTE-part provided by the left and right hearing instruments.

Each of the left and right hearing instruments of the binaural hearing aid system may comprise a forward audio signal path configured to process an electric input signal representing sound (e.g. sound in an environment around the user) to thereby provide a processed signal, and to provide output stimuli at the left and right ears, respectively, of the user in dependence of the processed signal. The forward audio signal path may comprise a processor configured to apply a processing algorithm to the electric input signal or to a signal originating therefrom and to provide the processed signal.

The forward audio signal path may comprise an input unit for providing at least one electric input signal representing sound. The input unit may comprise an input transducer for the providing at least one electric input. The input transducer may comprise a microphone, a vibration sensor, or an audio receiver. The input unit may comprise an analogue to digital converter for converting an analogue input audio signal to a stream of digital audio samples. The input unit may comprise an analysis filter bank for converting a time domain input signal to a multitude of frequency sub-band signals representing the (time-domain) electric input signal in the (time-) frequency domain.

The forward audio signal path may comprise an output unit for converting an output signal (e.g. a processed signal) to stimuli perceivable to the user as sound. The output unit may comprise an output transducer. The output transducer may comprise a loudspeaker, a vibrator, a multi-electrode, or an audio transmitter.

The correlation measure may be or comprise a covariance. The controller may be configured to detect whether or not the left and right instruments are aligned by monitoring the covariance between the acceleration data measured at the left and the right instruments, e.g. a cross-covariance between the left and the right instruments, i.e. $R=E[a_L a_R^T]$ where $E[\bullet]$ is the expectation operator, $a_L$ and $a_R$ are the (possibly processed) acceleration vectors, and T indicates transposition.

The acceleration data of each of the left and right hearing instruments may comprise acceleration data representing the at least two directions.

The controller may be configured to determine how or whether the different signals comprised in the acceleration data, e.g. acceleration data from each of the at least two directions (e.g. from three directions) are correlated. The acceleration data (of each of the left and right hearing instruments) may comprise acceleration data representing three (e.g. orthogonal) directions (e.g. x, y, z axes of an orthogonal coordinate system).

The controller may be configured to base the decision of whether or not the left and right hearing instruments are correctly mounted on an estimated cross-covariance matrix obtained from the (e.g. averaged) outer product of the acceleration signals from the left and right hearing instruments, respectively. The acceleration signals may be represented by 2D or 3D vectors ($a_L=[x_L, y_L]$ and $a_R=[x_R, y_R]$ or $a_L=[x_L, y_L, z_L]$ and $a_R=[x_R, y_R, z_R]$) from the left and right hearing instruments, respectively. For a three-dimensional (3D) acceleration sensor providing acceleration data representing three (e.g. orthogonal) directions (e.g. x, y, z), the matrix CLR resulting from the outer product of the acceleration data (represented by vectors $[x_L, y_L, z_L]$, $[x_R, y_R, z_R]$) from the left and right hearing instruments can be expressed as $$C_{LR} = \begin{bmatrix} x_L x_R & y_L x_R & z_L x_R \\ x_L y_R & y_L y_R & z_L y_R \\ x_L z_R & y_L z_R & z_L z_R \end{bmatrix}$$

i.e. a matrix having the diagonal values $[x_L x_R, y_L y_R, z_L z_R]$, and the off diagonal values $[x_L y_R, x_L z_R, y_L z_R, y_L x_R, z_L x_R, z_L y_R]$. In this notation, the cross-covariance matrix R is $R_{LR}=<C_{LR}>$, where $<\cap>$ denotes average across time.

The controller may be configured to detect differences between the left and right movement (e.g. acceleration) patterns to thereby decide whether or not the hearing instruments are correctly mounted.

The controller may be configured to decide that the hearing instruments are correctly mounted when the magnitude of the diagonal elements of the cross-covariance matrix are relatively high, e.g. larger than a (first) threshold value. A relatively high value of the diagonal elements may either be due to gravity, or due to movement (the gravity component may be removed before the cross-covariance matrix is estimated). If the means have not been removed, the acceleration vector will be influenced by the direction of gravity. E.g. gravity may point in the direction of $z_L$ and $z_R$. Hence $z_L z_R$ will yield a high value.

The controller may be configured to decide that the hearing instruments are in-correctly mounted when at least one, or at least two, of the off-diagonal elements is(are) relatively high, e.g. larger than a (first) threshold value, and the diagonal elements at the same time have relatively low values, e.g. smaller than a (second) threshold value. The detection by the controller of an incorrect mounting of the left and right hearing instruments may be based on an estimation of how frequent the magnitude of the off-diagonal elements are higher than the magnitude of the diagonal elements (e.g. provided by a counter). The first and second threshold values may be equal or different.

The detection by the controller of an incorrect mounting of the left and right hearing instruments may be based on the value of a ratio between the diagonal elements and the off-diagonal elements (D-OD-R) of the cross-covariance matrix R, $$D-OD-R = \frac{\sum |\text{diagonal elements of } R|}{\sum |\text{off-diagonal elements of } R|}$$

where $|\cap|$ represents the magnitude (or squared magnitude) of individual elements of the cross-covariance matrix R.

A criterion for detection of correctly mounted instruments may thus be

Hearing instruments are correctly mounted if D-OD-R≥TH1, and

Hearing instruments are in-correctly mounted if D-OD-R≤TH2.

TH1 may be larger than or equal to TH2. TH1 may e.g. be larger than or equal to 1, such as larger than or equal to 2, e.g. larger than or equal to 2.5. TH2 may e.g. be smaller than or equal to 1.5, such as smaller than or equal to 1, e.g. smaller than or equal to 0.5.

The time constants used to calculate the cross-covariance matrices may e.g. be larger than 1 second, such as larger than 10 seconds or larger than 60 seconds or larger than 10 minutes.

The controller may comprise a neural network configured to detect an incorrect mounting of the hearing instruments.

The term 'neural network' or 'artificial neural network' may cover any type of artificial neural network, e.g. feed forward, convolutional, recurrent, e.g. long/short term memory, gated recurrent unit (GRU), etc.

The size and/or type of the neural network may be adapted to the power capabilities and size of a portable device (e.g. battery driven), e.g. to a hearing device, such as a hearing aid or a pair of earphones of a headset.

The neural network may e.g. be configured to detect whether or not the left and right hearing instruments are correctly mounted in dependence of a similarity measure between acceleration data provided by the left and right hearing instruments.

The neural network may be configured to receive acceleration data from the left and/or right hearing instruments as input features, or elements of a cross-covariance matrix of the acceleration data from the left and right hearing instruments (or otherwise processed versions of the acceleration data from the left and right hearing instruments). The neural network may be trained on examples of acceleration patterns obtained, when the instruments are correctly mounted and examples of acceleration patterns obtained from situations where the instruments are incorrectly mounted.

The input data (e.g. an input feature vector) to the neural network may e.g. comprise or be constitute by data from one or more movement sensors, e.g. accelerometers (and/or gyroscopes and/or magnetometers, etc.). The movement sensor(s) may be located in or at an ear or ears of a user of a hearing device or hearing system. The input data may, however, additionally or alternatively, comprise a processed versions of data from the movement sensor(s), e.g. filtered or down-sampled versions, or in the form of a similarity measure indicative of the similarity between data from movements sensors located at the left and right ears of the user (i.e. from respective devices of a binaural hearing system, e.g. a binaural hearing aid system or a headset comprising left and right ear pieces, e.g. earphones).

The input data (e.g. an input feature vector) of the neural network may be constituted by or comprise data for a given time instance (n, e.g. 'now'). The input data may e.g. be constituted by or comprise data for a the given time instance (n) and a number (N) of previous time instances. The latter may be advantageous depending on the type of neural network used (in particular for feed forward-type or convolutional-type neural networks). The 'history' of the data represented by the (N) previous time instances may be included in the neural network, e.g. in a recurrent-type neural network, e.g. comprising a GRU. Alternatively, the (time-) history of the data may be included by low-pass filtering the data before entering the neural network (i.e. the input feature vector—at a given time instance (n)—may comprise lowpass-filtered acceleration data from x-, y- and z-directions of accelerometers at one or both sides of the ear of the user. Thereby the number of computations performed by the neural network can be decreased.

The output of the neural network may e.g. comprise a similarity measure based on input data from both sides of the head of the user (e.g. from accelerometer data from both hearing instruments of a binaural hearing system, e.g. a binaural hearing aid system). The output of the neural network may e.g. comprise an indicator of whether or not the hearing instrument at a given ear is correctly mounted (e.g. from accelerometer data from one or both hearing instruments of a binaural hearing aid system). The output of the neural network may e.g. comprise an indicator of whether or not a given one of the hearing instruments is correctly mounted (e.g. from accelerometer data from both hearing instruments of a binaural hearing aid system).

The neural network may comprise a number layers, e.g. an input layer and an output layer and a number of layers (termed 'hidden' layers) in between. Depending on the number of hidden layers, the neural network may be termed a 'deep' neural network. The number of hidden layers may e.g. be smaller than or equal to 10, such as smaller than or equal to 5.

Different Layers may represent different neural network types, e.g. one or more layers implemented as recurrent neural network (e.g. GRUs) and one or more layers implemented as feed forward or convolutional neural networks.

The number of parameters characterizing the functionality of the nodes of the neural network (e.g. their weight, bias and/or non-linearity) may be limited to the application in question. The number of parameters may e.g. be smaller than 1 million, such as smaller than 500.000, such as smaller than 100.000, such as smaller than 25.000. In a typical (state of the art) hearing aid application, the number of parameters characterizing the neural network may e.g. be of the order of 500-5000.

The number of input nodes of the neural network may e.g. be smaller than or equal to 100, such as smaller than or equal to 50

Based on examples of left and right (or simply monaural) movement patterns as labeled input training examples to a neural network, the network parameters (e.g. weights, and/or biases) may be optimized towards classifying the acceleration pattern as corresponding to the hearing instruments being either correctly mounted or incorrectly mounted. Binary cross entropy may be applied as loss function. The training examples may be obtained from a database of acceleration patterns recorded from different users, where the acceleration patterns are either labelled as "correctly mounted" or "incorrectly mounted" hearing instruments (e.g. examples as shown in FIG. 6A, 6B). The classifier may also contain more than two classes. E.g. it may be detected based on acceleration measurements whether the instruments are mounted in a hearing aid battery charger (so that mounting in a charger can be differentiated from a mounting at the ear of the user, and optionally used for controlling the hearing device(s), e.g. for closing down or activating certain parts of the device(s), while located in the charger). The neural network may be trained only on a subset of the training data, e.g. a subset which corresponds to a hearing aid mounting at the particular hearing aid user (e.g. acceleration patterns corresponding to a similar direction of gravity during use). Another subset could be depending on age, as acceleration patterns of e.g. toddlers may be very different from the acceleration patterns of an adult.

Parameters that participate in the optimization (training) of the neural network may include one or more of the weight-, bias-, and non-linear function-parameters of the neural network.

In a training phase, the neural network may be randomly initialized and may thereafter be updated iteratively. The optimized neural network parameters (e.g. a weight, and a bias-value) for each node may be found using standard, iterative stochastic gradient, e.g. steepest-descent or steepest-ascent methods, e.g. implemented using back-propagation minimizing a cost function, e.g. the mean-squared error, in dependence of the neural network output and the 'ground truth' values associated with the training data. The cost function (e.g. the mean-squared error, or a (binary) cross entropy loss) may e.g. be computed across many training pairs of the input signals (i.e. input data and associated (expected) output).

A set of optimized parameter settings is the parameter setting that maximize (or minimize) the chosen cost function. When the optimized parameter settings have been determined, they are stored for automatic or manual transfer to the hearing device(s), e.g. hearing aid(s) or ear phones of a headset.

An optimized set of parameters may depend on the hearing aid type (e.g. BTE or ITE). It may depend on the user's activity level (e.g. previously logged acceleration patterns), the users age or gender, etc. The optimal set of parameters may be selected from a finite set of pretrained parameters. The selection of the pretrained parameter set may depend on the classification of the user into a specific group with similar movement patterns (e.g. depending on wearing angle of the instruments, age, head size, users' height and/or activity level).

The binaural hearing aid system may be configured to control processing of at least one of the left and right hearing instruments in dependence of whether or not the left and right hearing instruments are correctly mounted. Control of the processing may e.g. comprise controlling one or more processing parameters of a processing algorithm, e.g. noise reduction/directionality. Control of the processing may e.g. comprise issuing a warning (e.g. related to the function of the hearing aid system in view of the current mounting state of the left and right hearing instruments (e.g. if it is detected that the left and right hearing instruments are not correctly mounted).

The binaural hearing aid system may be configured to trigger a warning of the user in case it is detected that the left and right hearing instruments are not correctly mounted. Detection that the left and right hearing instruments are not correctly mounted may be concluded in case the at least one direction relative directions of the two instruments are not aligned. This warning (e.g. a spoken warning message) may be presented to the user via an output transducer of the at least one of the left and right hearing instruments, or via a separate device, e.g. a remote control, e.g. implemented as an APP of a smartphone. The warning may e.g. be a warning message sent from the hearing instrument to a caretaker's phone (or similar device), e.g. aiming at incurring the caretaker to check the current mounting of the left and right hearing instruments. The binaural hearing aid system may comprise memory storing data representative of one or more warnings, e.g. related to whether or not the left and right hearing instruments are correctly mounted. Such logged data may be useful information for the hearing care professional in order to monitor if instruments have been correctly used.

The binaural hearing aid system may be configured to disable a directional noise reduction algorithm of the left and right hearing instruments (e.g. in case it is detected that the left and/or right hearing instruments is/are not correctly mounted). Thereby directional noise reduction may be prevented from (unintentionally) attenuating audio from a target direction. The left and right hearing instruments may be set into an omnidirectional mode, until it is detected that the issue has been fixed (i.e. when it has been verified (e.g. detected) that the left and right hearing instruments are correctly mounted. This may be detected automatically or manually, e.g. via a phone or a remote control or a separate portable processing device connected to the hearing instrument(s).

The binaural hearing aid system may be configured to provide that the detection of whether the left and right hearing instruments are correctly mounted (e.g. additionally) is dependent on other input features than said acceleration data. The detection of whether the left and right hearing instruments are correctly mounted may e.g. be dependent on the detection of a changed feedback path estimate. The left and right hearing instruments may comprise a feedback control system configured to provide an estimate of feedback from an (electric to acoustic) output transducer to an (acoustic to electric) input transducer of the respective hearing instrument.

The binaural hearing aid system may be configured to provide that correlation between the acceleration data provided by the left and the right instruments is maximum when at least one direction relative to the housing of the BTE-parts of the respective left and right hearing instruments are parallel. The binaural hearing aid system may be configured to provide that the correlation between the acceleration data provided by the left and right hearing instruments is maximum when a left and right x-axis, a left and right y-axis, and a left and the right z-axis of a 3D acceleration sensor are parallel.

The binaural hearing aid system may be configured to average the covariance between the acceleration data provided by the left and the right instruments across time. The binaural hearing aid system (e.g. the controller) may be configured to provide that the averaging is based on a moving average or an IIR-filter-based averaging, such as a first order IIR filter.

The binaural hearing aid system may be configured to average the covariance between the acceleration data provided by the left and the right instruments across time based only on samples in which acceleration above a certain threshold has been detected. If the left and right hearing instruments are well-aligned, it is expected that the diagonal elements will contain the highest values. A high off-diagonal value will indicate that the instruments are not aligned.

The binaural hearing aid system may be configured to remove the DC value from the acceleration data in order to base the alignment assessment on head movements. In an embodiment, the DC value has not been removed from the acceleration data in order to base the alignment assessment on the direction of gravity.

The binaural hearing aid system may be configured to provide that at least one of the left and right hearing instruments comprises a predefined reference position representing a correctly mounted hearing instrument.

The binaural hearing aid system may be configured to provide that the detection of whether the left and right hearing instruments are correctly mounted is dependent on said reference position. This assessment may be divided into two different parts: Each instrument's tilt may be measured based on the angle between each instrument's angle and a reference gravity direction. As such a measurement does not reveal if the instrument is pointing towards a reference direction in horizontal plane (which is orthogonal to the direction of gravity), an additional assessment on whether the instruments are mounted in parallel may reveal if one or both instruments are pointing towards the sides rather than towards the front.

The binaural hearing aid system (e.g. the controller) may be configured to provide that the gravity component of the acceleration sensor has been removed from the acceleration data. Thereby a two- or three-dimensional movement detector may be provided.

The binaural hearing aid system (e.g. the controller) may be configured to provide that the acceleration data are band-pass filtered.

The binaural hearing aid system may be configured to provide that at last one (or both) of the left and right hearing instruments is(are) constituted by or comprises an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, e.g. less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e g frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid. A mode of operation may include a mounting mode configured to determine whether or not the hearing aid or hearing aid system is correctly mounted at the ears of the user.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (level-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of
a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a binaural hearing aid system comprising left and right hearing instruments adapted to be located at or in left and right ears, respectively, of a user, is provided. Each of the left and right hearing instruments comprises a BTE-part configured to be located at or behind an outer ear of the user, the BTE-part comprising
a housing; and
an acceleration sensor configured to measure acceleration in at least two directions relative to the housing of the BTE-part.

The method comprises providing by said acceleration sensor acceleration data indicative of a current acceleration in said at least two directions;

transmitting by at least a first one of the left and right hearing instruments acceleration data from the acceleration sensor to the second one of the left and right hearing instruments, and receiving by at least a second one of the left and right hearing instruments the acceleration data from the acceleration sensor transmitted by the first one of the left and right hearing instruments.

The method may further comprise determining a similarity (e.g. correlation) measure between said acceleration data provided by the left and right hearing instruments; and detecting by the at least the second one of the left and right hearing instruments whether or not the left and right hearing instruments are correctly mounted in dependence of said similarity (e.g. correlation) measure.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 2A illustrates in side (top) and top (bottom) views of two hearing instruments mounted in parallel that they will have highly correlated acceleration patterns, such that the left and right x acceleration pattern will be highly correlated, and similarly for accelerations measured in the y and z-direction; and FIG. 2B illustrates again in side (top) and top (bottom) views a case where the hearing instruments are not mounted in parallel (or as intended), where it can be detected that accelerations caused by movements will be correlated in a different way (the x and y accelerations are not parallel in the two hearing instruments)

The figures are schematic and simplified for clarity, and they just show details which are essential to the understanding of the disclosure, while other details are left out. Throughout, the same reference signs are used for identical or corresponding parts.

Figure 1:
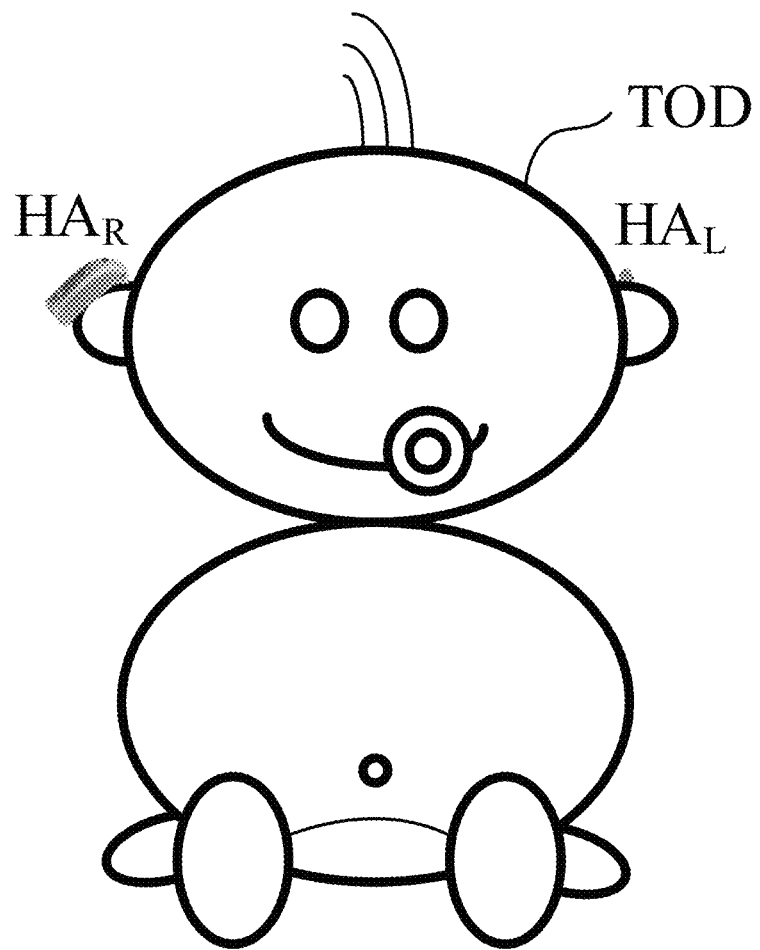
FIG. 1 is a schematic illustration of two hearing instruments mounted at the ear of a toddler, where the instrument is correctly positioned on the toddler's left ear but incorrectly positioned on the toddler's right ear.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present disclosure relates to the field of hearing devices, e.g. hearing aids, configured to be worn at one or more ears of a user. The present relates in particular to a scheme for detecting whether or not the hearing device (or hearing devise) are correctly mounted at the ear (or ears) of the user. The disclosure may also be relevant for wireless headset, e.g. in the form of earbuds or hearables, e.g. to control if a specific feature shall be in monaural or binaural mode.

In a binaural setup, the fact that the acceleration patterns between the two hearing instruments will be highly correlated while the hearing instruments are worn at the two ears can be advantageously utilized. If the hearing instruments both are pointing towards the same direction (or calibrated such that the axis of the left and the right accelerometers are aligned), it is expected that the acceleration along the x-axis of an instrument worn at one ear mainly will be correlated with the acceleration along the x-axis measured along the instrument worn at the contralateral ear. And similarly, the accelerations measured along the y axis of the instruments will be correlated as well as the accelerations along the z axis.

By comparing the acceleration patterns of the two instruments, it is thus possible to detect whether the two instruments are pointing towards the same direction or pointing in different directions, as illustrated in FIG. 1.

FIG. 1 is a schematic illustration of two hearing instruments mounted at the ear of a toddler, where the instrument is correctly positioned on the toddler's left ear but incorrectly positioned on the toddler's right ear. Even though both moulds are correctly mounted in the ear canals, the BTE part of the hearing instrument is not necessarily correctly positioned behind the ear.

If a hearing instrument of a binaural hearing aid system is not correctly positioned, it may affect the quality of the signal presented to the listener. E.g. directional noise reduction may assume that the target is in a particular direction compared to the hearing instrument, e.g. in front of the instrument. If the instrument is not correctly mounted, noise reduction may degrade the audio signal rather than improving it. Furthermore, if the placement is incorrect, the applied gain is incorrect, such that the audibility of sounds or the speech intelligibility is degraded. It is thus important to detect if the hearing instrument is incorrectly mounted. This is in particular important for people who are not aware that the hearing instrument is not working as intended (e.g. toddlers).

In case it is detected that the directions of the two instruments are not aligned, a warning could be triggered. This could e.g. be a warning message sent from the hearing instrument to the caretaker's phone (or similar device).

Another consequence of detecting an unintended hearing instrument position could be to disable directional noise reduction, hereby preventing a directional noise reduction from attenuating audio from a target direction. The hearing instrument should thus be set into an omnidirectional mode, until it is detected that the issue has been fixed. This may as well be detected automatically or manually, e.g. via a phone connected to the instrument.

The detection could be combined with other input features e.g. the detection of a changed feedback path estimate.

One way to detect if the left and right instrument is not aligned is to monitor the covariance between the acceleration measured at the left and the right instruments (e.g. determining the cross-covariance matrix).

If the left and right instruments are mounted as intended, it is assumed that the x, y, and z acceleration patterns measured on the left ear, are correlated in a certain way with the corresponding acceleration patterns measured on the right ear. This is illustrated in FIG. 2A, 2B. FIG. 2A. shows the intended mounting, where the acceleration directions on the left and the right instruments are parallel (for simplicity, we show the intended directions as parallel, as we can always rotate the acceleration patterns such that they are parallel when the instrument is used as intended).

FIG. 2A shows in side (top) and top (bottom) views of two hearing instruments mounted in parallel that they will have highly correlated acceleration patterns, such that the left and right x acceleration pattern will be highly correlated, and similarly for accelerations measured in the y and z-direction.

FIG. 2B illustrates again in side (top) and top (bottom) views a case where the hearing instruments are not mounted in parallel (or as intended), where it can be detected that accelerations caused by movements will be correlated in a different way (the x and y accelerations are not parallel in the two hearing instruments). Or phrased more generally: It can be detected that the acceleration coordinate systems in the two hearing instruments (each coordinate system is spanned by the x, y and z accelerations) are mis-aligned.

When the left and right acceleration patterns are parallel, it is likely that the highest correlation is observed between the left and right x-axes, the left and right y-axes, and the left and the right z-axes. FIG. 2B shows the left and right accelerometer axes, in the case where the instruments are not mounted as intended (in this case, the right instrument is pointing slightly towards the right).

Figure 3A:
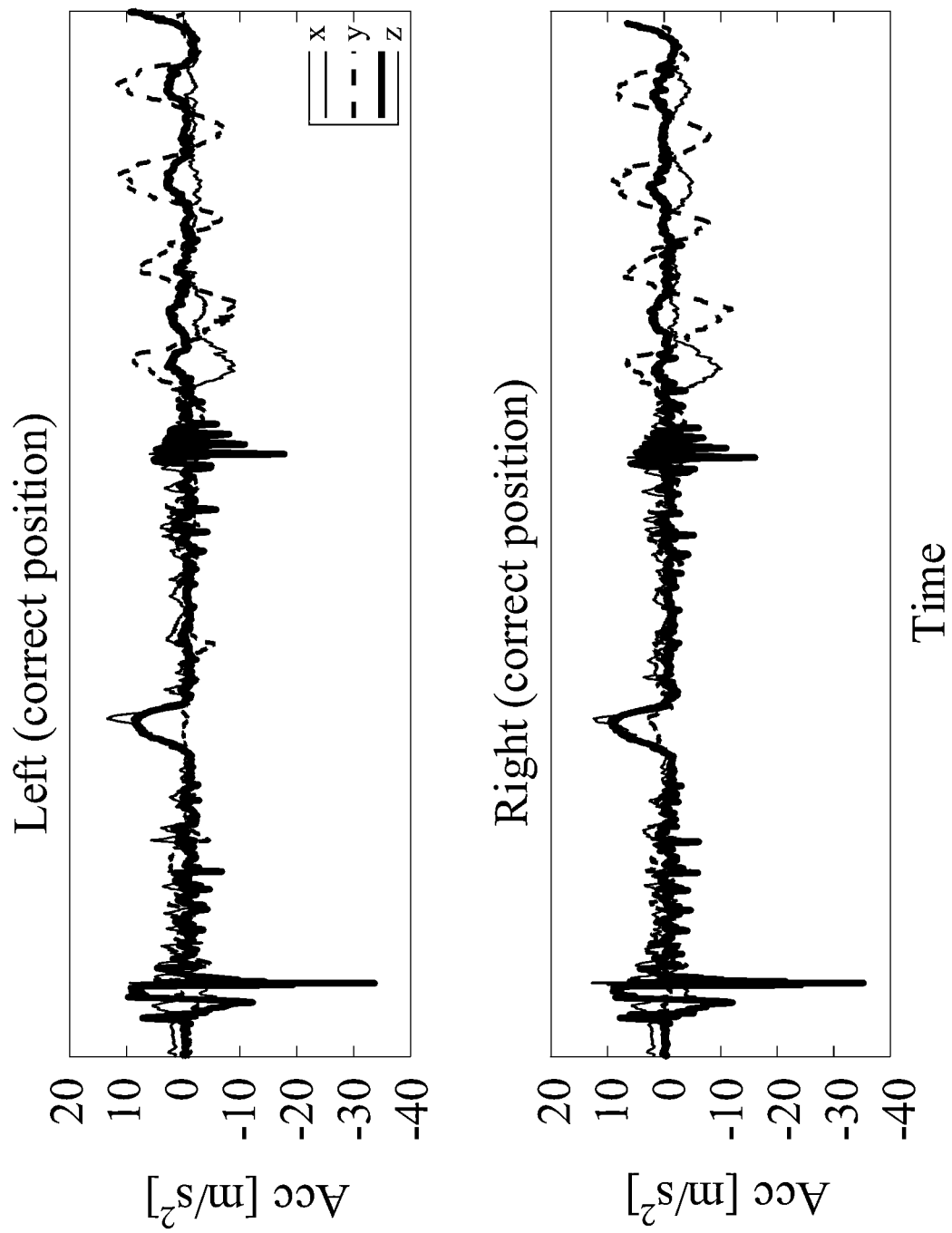
FIG. 3A shows measured left and right acceleration patterns in left and right instrument, respectively, with two correctly mounted instruments.

FIG. 3A shows measured left and right acceleration patterns in left and right instrument, respectively, with two correctly mounted instruments.

Figure 3B:
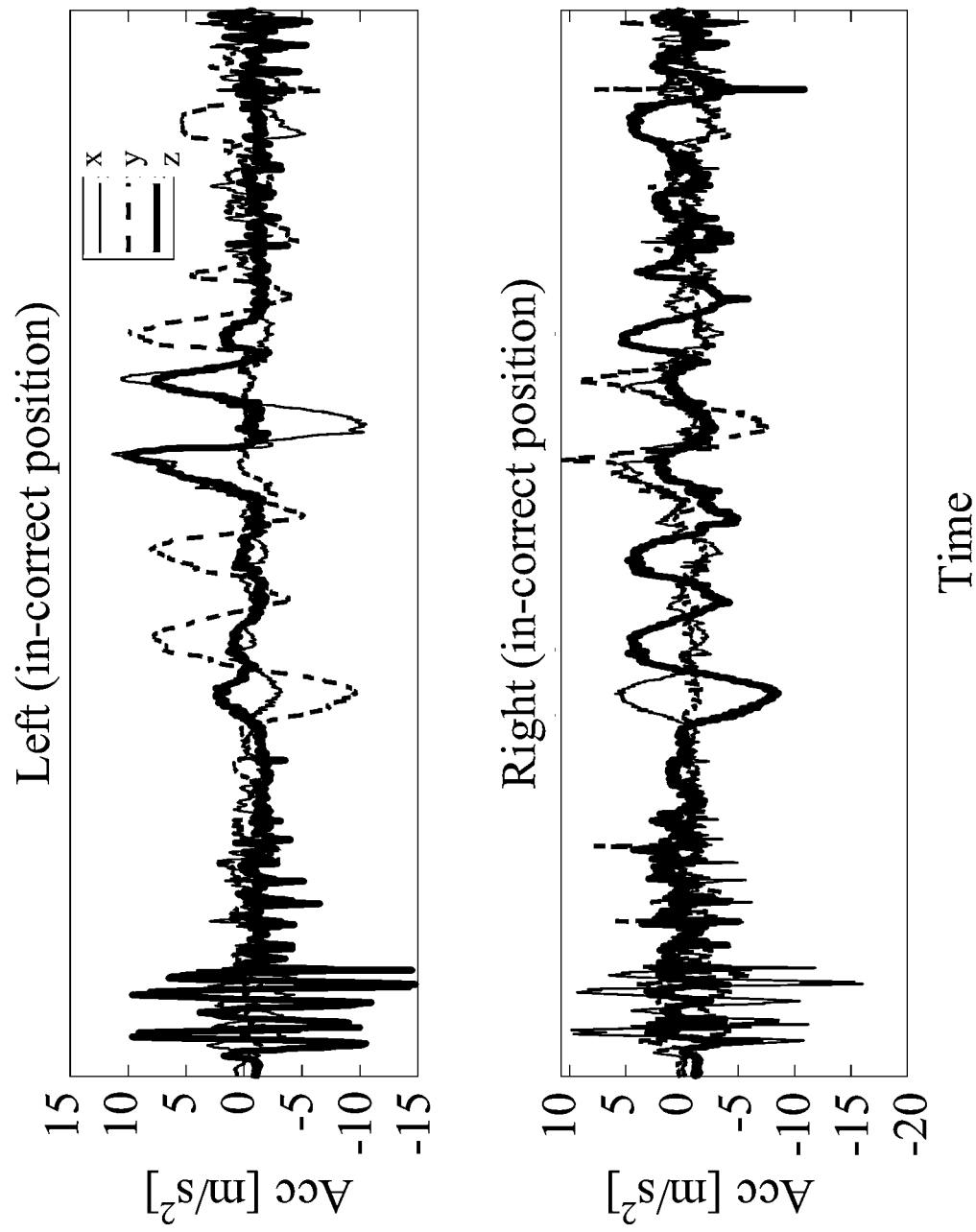
FIG. 3B shows measured left and right acceleration patterns in left and right instrument, respectively, in the case, where the right instrument is incorrectly mounted.

FIG. 3B shows measured left and right acceleration patterns in left and right instrument, respectively, in the case, where the right instrument is incorrectly mounted.

FIGS. 3A and 3B each show measurements of acceleration patterns from the x, y, and z directions. FIG. 3A shows the acceleration patterns when the instruments are mounted in parallel (e.g. instruments correctly mounted). The term 'parallel' is in the present context taken to mean that the coordinate systems spanned by the three acceleration directions of the respective hearing instruments have parallel axes pointing towards the same directions.

FIG. 3B shows the measured acceleration patterns when the instruments are not correctly mounted. The mean has been removed in order to focus on the movement-related patterns rather than the gravity-related accelerations. We notice that the left and right acceleration axes are highly correlated in the correctly mounted instruments, whereas the acceleration patterns between the left and the right instruments in the incorrectly mounted instruments are less aligned. Notice, even though the hearing instruments are mounted correctly, the acceleration along the y-axes (pointing towards the side) may be negatively correlated. This is due to the fact that the y-accelerations from the left and right instruments point in the opposite direction, when the head is turned from side to side. Likewise, as illustrated in FIG. 3B, strong, unexpected correlations between different axes may as well indicate that one of the instruments is incorrectly mounted.

In an embodiment, the alignment is based on the correlation between the left and the right acceleration patterns. The correlation measure may e.g. be based on the covariance between the left and right acceleration pattern, i.e.

$$R = \langle a_L a_R^T \rangle,$$

where R (elsewhere in the application also denoted $R_{LR}$) is the cross-covariance matrix, $a_L = [x_L, y_L, z_L]^T$ is the left instrument's acceleration vector, $a_R = [x_R, y_R, z_R]^T$ is the right instrument's acceleration vector at a given time, $^T$ denotes transposition, and $\langle \cdot \rangle$ denotes the expectation operator. The expectation operator indicates an averaging (e.g. low-pass filtering) across time. The averaging across time may be based on a moving average or on an IIR-filter-based averaging, such as a first order IIR filter. In an embodiment, the averaging is only based on samples in which acceleration above a certain threshold has been detected. If the instruments are well-aligned, it is expected that the diagonal elements will contain the highest values. A high off-diagonal value will indicate that the instruments are not aligned.

In an embodiment, the cross-covariance matrix is normalized, where the normalization is based on at least one diagonal element.

In an embodiment, the DC value has been removed from the acceleration data in order to base the alignment assessment on head movements (as implied by the cross-covariance).

In an embodiment, the DC value has not been removed from the acceleration data in order to base the alignment assessment on the direction of gravity.

It may be advantageous to make assessments based on the gravity direction (to check if the two instruments agree on the direction of gravity), as well as assessments based on the case where gravity has been removed (to check if the instruments agree on the movement patterns).

In an embodiment the alignment assessment between the instruments is based on the angle between the left and the right acceleration vector, e.g. given by $$\theta = \text{acos} \frac{a_L^T a_R}{\sqrt{a_L^T a_L a_R^T a_R}}.()$$

Or a similar monotonic function such as $$\dot{\theta} = \frac{(a_L^T a_R)^2}{a_L^T a_L a_R^T a_R} \text{sign}(a_L^T a_R).$$

In this case, we need the direction of gravity (i.e. the mean acceleration value should not be removed from the acceleration data).

In another embodiment, the alignment assessment procedure is used to detect how well a set of instruments is mounted compared to a reference position. This assessment may be divided into two different parts: Each instrument's tilt may be measured based on the angle between each instrument's angle and a reference gravity direction. As such a measurement does not reveal if the instrument is pointing towards a reference direction in horizontal plane (which is orthogonal to the direction of gravity), an additional assessment on whether the instruments are mounted in parallel may reveal if one or both instruments are pointing towards the sides rather than towards the front. Hereby anatomical differences between individuals can be taken into account during fitting.

Figure 4:
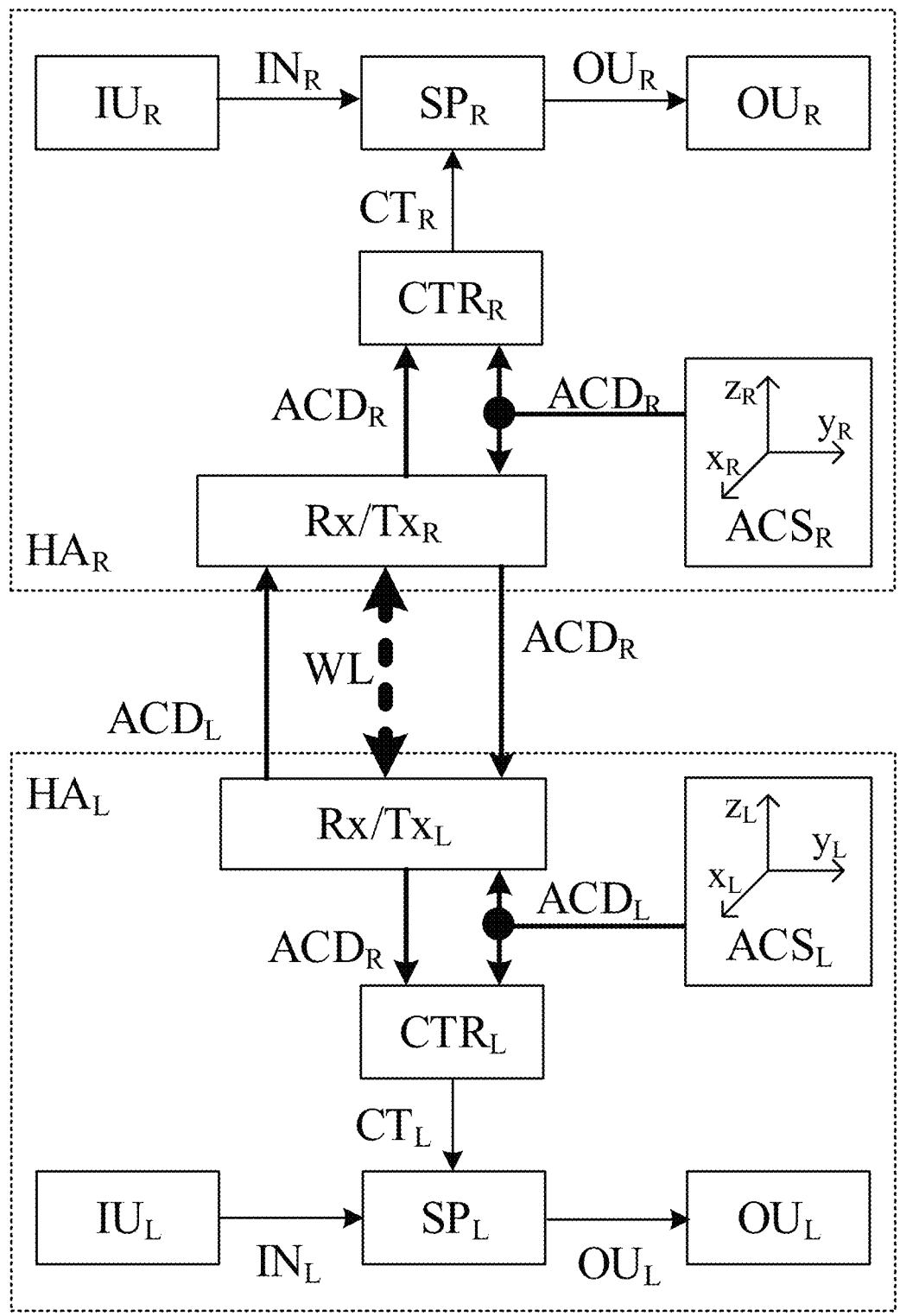
FIG. 4 shows a first embodiment of a binaural hearing aid system according to the present disclosure.

FIG. 4 shows a first embodiment of a binaural hearing aid system according to the present disclosure. FIG. 4 shows a binaural hearing aid system comprising left and right hearing instruments ($HA_L$, $HA_R$) adapted to be located at or in left and right ears, respectively, of a user. Each of the left and right hearing instruments comprises a BTE-part configured to be located at or behind an outer ear (pinna) of the user. The BTE-part comprises a housing (e.g. a mechanical shell enclosing components, e.g. electronic components) of the BTE-part. Each of the left and right hearing instruments further comprises an acceleration sensor ($ACS_L$, $ACS_R$) configured to measure acceleration in at least two directions relative to the housing of the BTE-part and to provide acceleration data ($ACD_L$, $ACD_R$) indicative thereof. The acceleration sensor ($ACS_L$, $ACS_R$) of each or the left and right hearing instruments may comprise a two-dimensional (2D), or a three-dimensional (3D), acceleration sensor, configured to provide respective measures of acceleration in two (2D-sensor) or three (3D-sensor) directions relative to the housing of the BTE-part.

It should be noted that from accelerations from a single dimension (a simple movement detector), we may detect if instruments have similar movement patterns. This may indicate if both instruments are located on the person's ears (or not located on the person's ears), based on similar movement patterns. However, we need at least two acceleration directions in order to determine if the instrument is correctly mounted.

The binaural hearing aid system is configured to provide that at least a first one (e.g. both) of the left and right hearing instruments comprises a transmitter ($Tx_L$, $Tx_R$) configured to allow transmission of acceleration data from the acceleration sensor to the second one of the left and right hearing instruments (or to a separate external device). The binaural hearing aid system is further configured to provide that at least a second one (e.g. both) of the left and right hearing instruments comprises a receiver ($Rx_R$, $Rx_L$) configured to allow reception of the acceleration data ($ACD_L$, $ACD_R$) from the acceleration sensor of the first one of the left and right hearing instruments. In other words, each of the left and right hearing instruments may be configured to allow an exchange of acceleration data from the respective acceleration sensors between them, cf. e.g. wireless link (WL) and data ($ACD_L$, $ACD_R$) in FIG. 4. The acceleration data may be pre-processed before being exchanged between the left and right instruments. The pre-processing may e.g. include low-pass filtering and/or down-sampling (e.g. to limit bandwidth (and hence power) consumption of the wireless link).

The binaural hearing aid system is further configured to provide that at least the second one (or both) of the left and right hearing instruments comprises a controller ($CTR_L$, $CTR_R$) configured to detect whether or not the left and right hearing instruments ($HA_L$, $HA_R$) are correctly mounted in dependence of a correlation measure between said acceleration data ($ACD_L$, $ACD_R$) provided by the left and right hearing instruments.

In the embodiment of FIG. 4, each of the left and right hearing instruments ($HA_L$, $HA_R$) of the binaural hearing aid system comprises a forward audio signal path configured to process an electric input signal ($IN_L$, $IN_R$) representing sound (e.g. sound in an environment around the user) to thereby provide a processed signal ($OU_L$, $OU_R$), and to provide output stimuli at the left and right ears, respectively, of the user in dependence of the processed signal. The forward audio signal path comprises a signal processor ($SP_L$, $SP_R$) configured to apply a processing algorithm to the electric input signal ($IN_L$, $IN_R$) or to a signal originating therefrom and to provide the processed signal ($OU_L$, $OU_R$).

In the embodiment of FIG. 4, the forward audio signal path of each of the left and right hearing instruments ($HA_L$, $HA_R$) comprises an input unit ($IU_L$, $IU_R$) for providing at least one electric input signal ($IN_L$, $IN_R$) representing sound. The input unit ($IU_L$, $IU_R$) may comprise an input transducer for the providing at least one electric input signal ($IN_L$, $IN_R$). The input transducer may comprise a microphone, a vibration sensor, or an audio receiver. The input unit ($IU_L$, $IU_R$) may comprise an analogue to digital converter for converting an analogue input audio signal to a stream of digital audio samples. The input unit may comprise an analysis filter bank for converting a time domain input signal to a multitude of frequency sub-band signals representing the (time-domain) electric input signal in the (time-) frequency domain.

In the embodiment of FIG. 4, the forward audio signal path of each of the left and right hearing instruments ($HA_L$, $HA_R$) comprises an output unit ($OU_L$, $OU_R$) for converting an output signal (($OU_L$, $OU_R$), e.g. a processed signal) to stimuli perceivable to the user as sound. The output unit may comprise ($OU_L$, $OU_R$) an output transducer (($OT_L$, $OT_R$), cf. e.g. FIG. 5). The output transducer ($OT_L$, $OT_R$) may comprise a loudspeaker, a vibrator, a multi-electrode, or an audio transmitter.

The controller ($CTR_L$, $CTR_R$) may be configured to determine how or whether the different signals comprised in the acceleration data ($ACD_L$, $ACD_R$), e.g. acceleration data from each of the at least two directions (e.g. from three directions) are correlated. The acceleration data (of each of the left and right hearing instruments) may comprise acceleration data representing three (e.g. orthogonal) directions (e.g. x, y, z).

Figure 5:
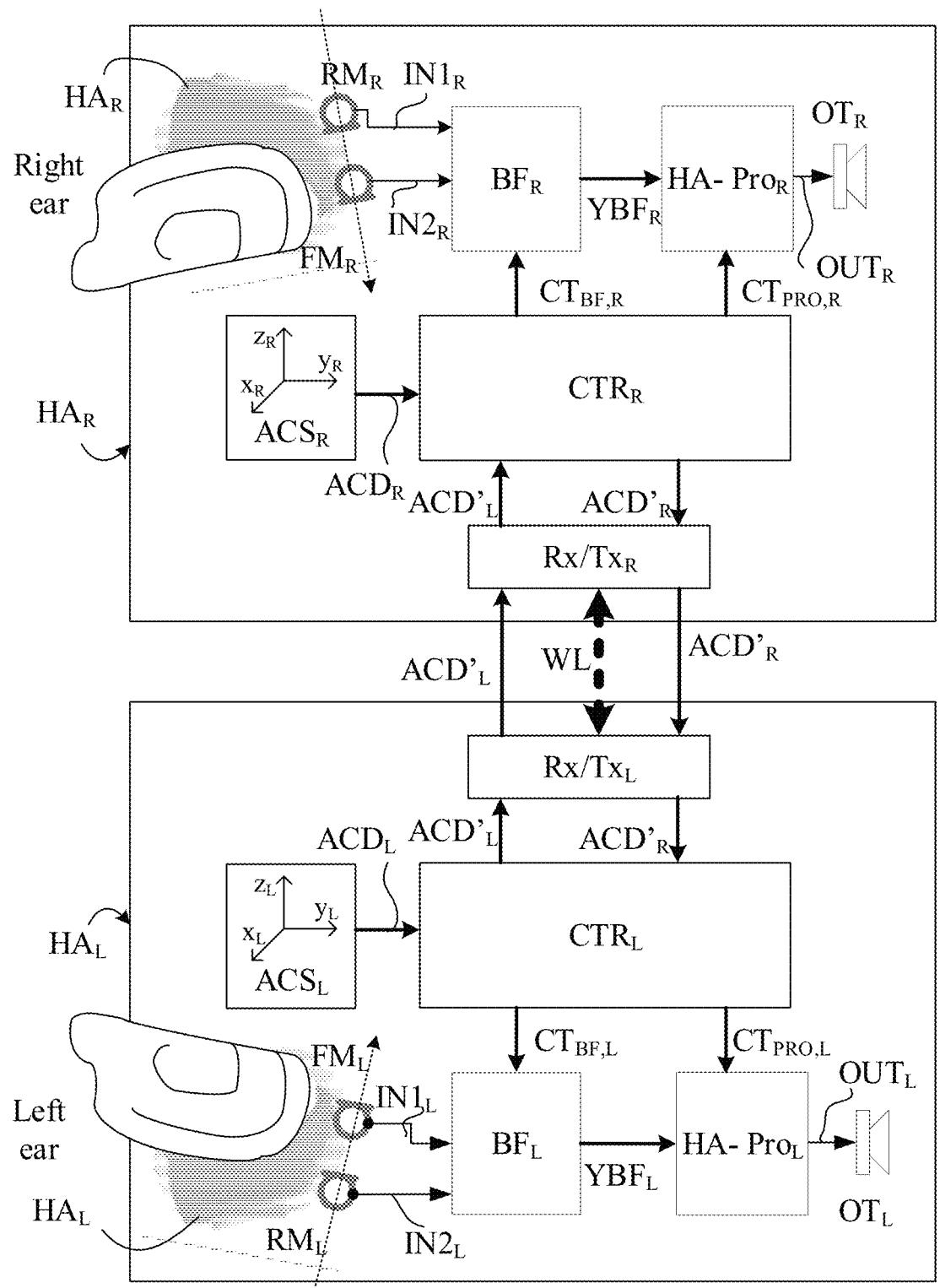
FIG. 5 shows a second embodiment of a binaural hearing aid system according to the present disclosure.

FIG. 5 shows a second embodiment of a binaural hearing aid system according to the present disclosure. The embodiment of a binaural hearing aid system illustrated in FIG. 5 is similar to the embodiment of FIG. 4, apart from the differences discussed in the following. In FIG. 5, each of the input units ($IU_L$; $IU_R$¤ in FIG. 4) of the left and right hearing instruments ($HA_L$; $HA_R$) comprises two microphones ($IN1_L$, $IN2_L$ and $IN1_R$, $IN2_R$, respectively) each microphone providing an electric input signal representing sound in the environment at the location of the microphone in question. Each of the left and right hearing instruments ($HA_L$; $HA_R$) further comprises beamformer ($BF_L$; $BF_R$) configured to provide respective spatially filtered signals ($YBF_L$; $YBF_R$) in dependence of the respective input signals ($IN1_L$, $IN2_L$ and $IN1_R$, $IN2_R$, respectively) and fixed or adaptively determined beamformer weights. The beamformer weights of the beamformers ($BF_L$; $BF_R$) of the left and right hearing instruments ($HA_L$; $HA_R$) may be controlled by control signals ($CT_{BF,L}$; $CT_{BF,R}$) provided by the respective control units ($CTR_L$; $CTR_R$) in dependence of acceleration data ($ACD_L$, $ACD'_R$; $ACD'_L$, $ACD_R$) from the acceleration sensors of left and right hearing instruments. In the embodiment of FIG. 5, both of the left and right hearing instruments ($HA_L$; $HA_R$) are incorrectly mounted at the left and right ears (cf. 'Left ear'; Right ear' in FIG. 5). This is indicated in FIG. 5 by the askew, dotted arrow through the microphones ($FM_L$, $RM_L$ and $FM_R$, $RM_R$). In the embodiment of FIG. 5, the signal processor ($SP_L$; $SP_R$) of the forward audio signal path of the respective left and right hearing instruments ($HA_L$; $HA_R$) may comprise the beamformer ($BF_L$; $BF_R$) and a hearing aid processor ($HA\text{-}Pro_L$; $HA\text{-}Pro_R$) for applying a level and frequency dependent gain to the spatially filtered signal (($YBF_L$; $YBF_R$) or to another signal of the respective forward audio paths) to compensate for the user's hearing impairment. The control units ($CTR_L$; $CTR_R$) may influence (control) processing of the respective hearing aid processors ($HA\text{-}Pro_L$; $HA\text{-}Pro_R$), cf. control signals ($CT_{PRO,L}$; $CT_{PRO,R}$) from the control units to the hearing aid processors. In the embodiment of FIG. 5, the output units ($OU_L$; $OU_R$¤ in FIG. 4) of left and right hearing instruments ($HA_L$; $HA_R$) comprise respective output transducers ($OT_L$; $OT_R$), e.g. in the form of loudspeakers. The output transducers may alternatively comprise respective vibrators of a bone conducting hearing aid.

The control units ($CTR_L$; $CTR_R$) of the left and right hearing instruments ($HA_L$; $HA_R$) may be configured to decide whether or not the hearing instruments are correctly mounted in dependence of (e.g. a comparison of) values of elements of the cross-covariance matrix $R_{LR}$, e.g. as described in connection with FIG. 6.

Figure 6A:
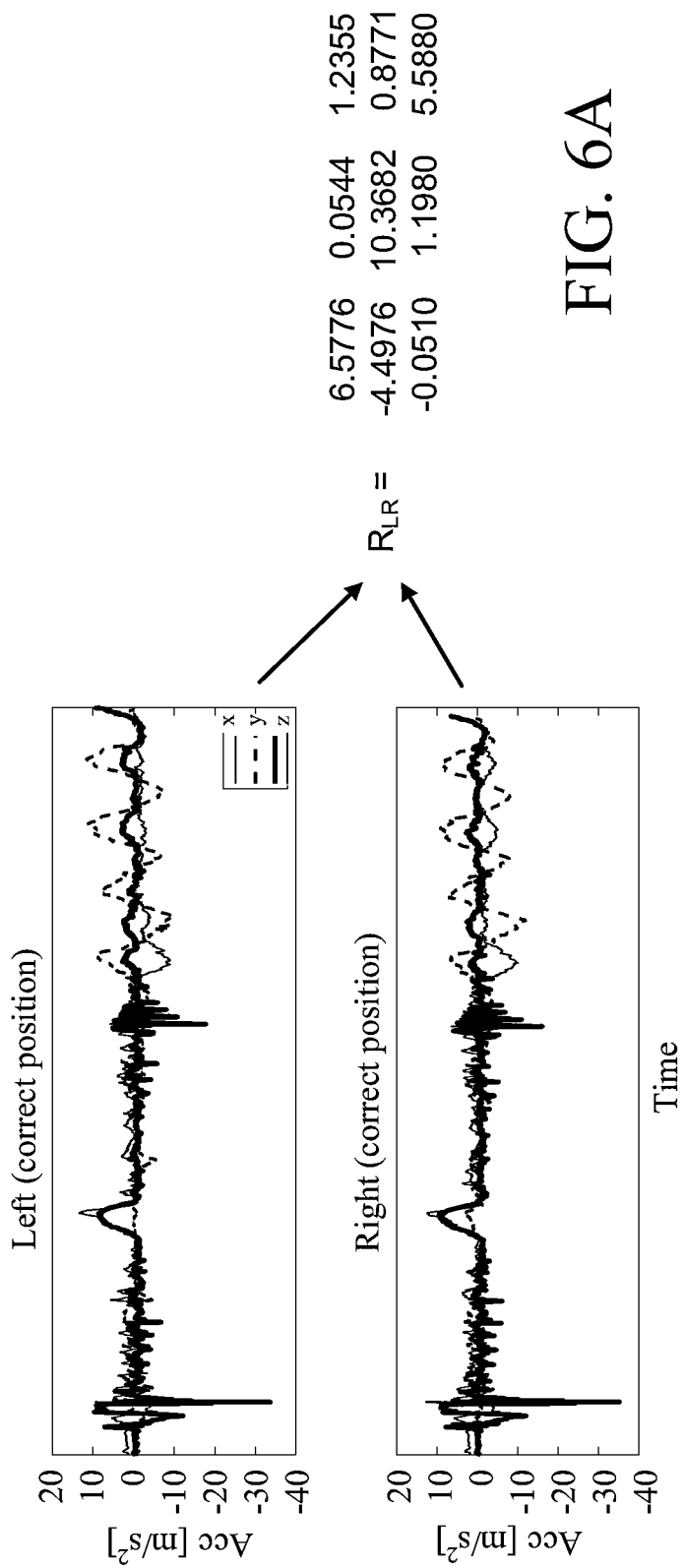
FIG. 6A shows an example of cross-covariances of acceleration data between a left and a right correctly mounted hearing instrument of a binaural hearing aid system according to the present disclosure.

FIG. 6A shows an example of cross-covariances of acceleration data between a left and a right correctly mounted hearing instrument of a binaural hearing aid system according to the present disclosure.

Figure 6B:
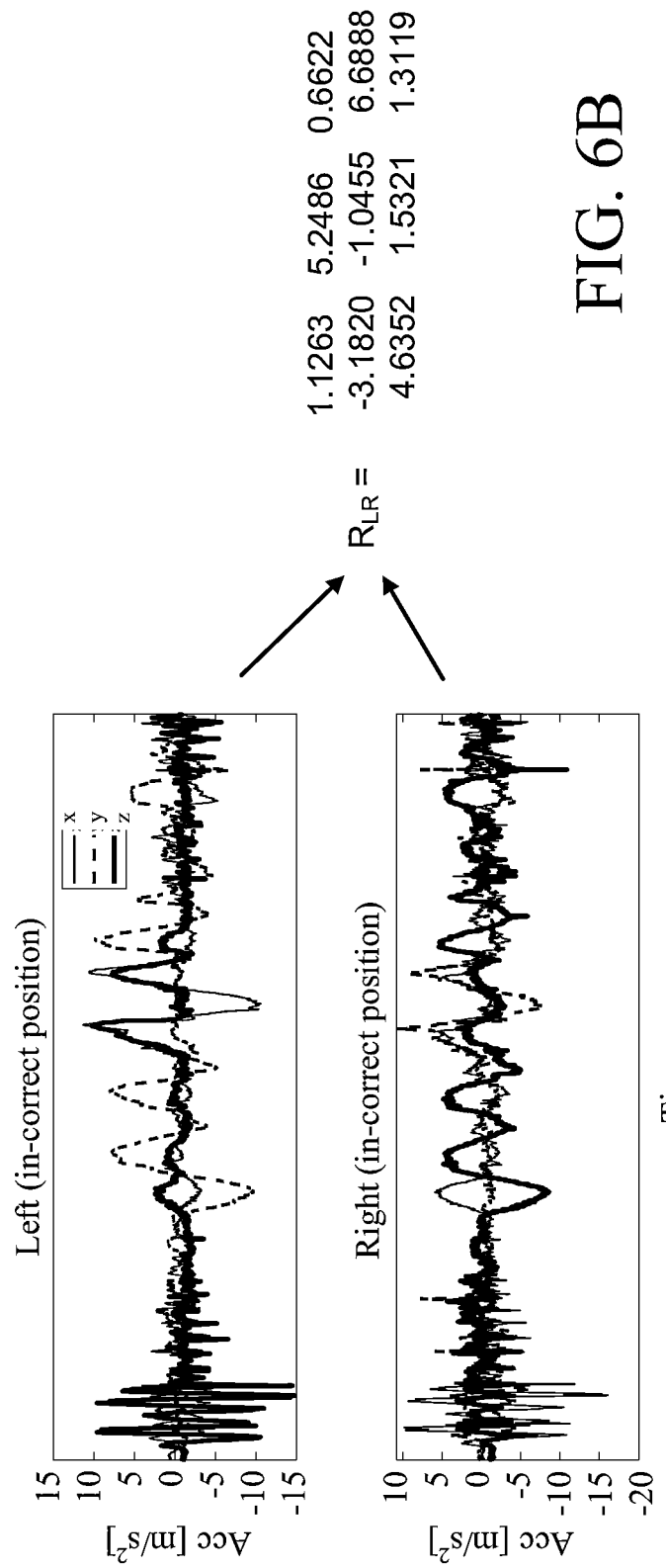
FIG. 6B shows an example of cross-covariances of acceleration data between a left and a right in-correctly mounted hearing instrument of a binaural hearing aid system according to the present disclosure.

FIG. 6B shows an example of cross-covariances of acceleration data between a left and a right in-correctly mounted hearing instrument of a binaural hearing aid system according to the present disclosure.

In the two cases of FIG. 6A, 6B, the cross-covariance matrix $R_{LR}$ is estimated as the outer (vector) product between the left acceleration vector ($a_L = [x_L, y_L, z_L]$) and the right acceleration vector ($a_R = [x_R, y_R, z_R]$) (averaged over time), both vectors being real-valued:

$$R_{LR} = <a_L \otimes a_R> = <\begin{bmatrix} x_L x_R & y_L x_R & z_L x_R \\ x_L y_R & y_L y_R & z_L y_R \\ x_L z_R & y_L z_R & z_L z_R \end{bmatrix}>$$

where <•> denotes averaging over time (or the 'expectation operator'). The acceleration vector(s) may be provided in the frequency domain (e.g. using a filter bank). Also, more general than just removing the mean, the acceleration data may be high-pass filtered (i.e. same as removing the mean) or band-pass filtered or low-pass filtered.

For simplicity, $a_L$ and $a_R$ may be processed versions of the raw acceleration vectors.

There may be two different mean values of the acceleration data: a) the DC-mean indicates a very slow varying mean value, whereas b) the mean value applied to movement (e.g. of the body) is based on fewer samples. The two different mean values may be implemented in terms of IIR lowpass filtering having two different time constants. Hereby the resulting signal becomes a band-pass filtered signal. The low-pass filter may be based on a moving average, i.e. a finite number of samples.

The figure shows the estimated cross covariance matrix (normalized over time by the number of time frames) in the case of correctly mounted hearing instruments (FIG. 6A) and the case of incorrectly mounted hearing instruments (FIG. 6B). The mean (caused by gravity) has been subtracted from the data (e.g. by providing $R_{LR} = E[(a_L - E[a_L]) (a_R - E[a_R])^T]$), but in addition, the difference between the direction of the left and right gravity vectors may also be used as an indication of both instruments having been correctly mounted. If the angle between the vectors deviates more than a threshold value, it may be assumed that the hearing instruments are incorrectly mounted. In the case where we would like to 'measure' the angle(s), the angle(s) between the mean acceleration vectors $E[a_L]$ and $E[a_R]$ may be determined (and used as an estimate).

In the case of the correctly mounted instruments, we notice that the magnitudes of the diagonal elements are higher compared to the off-diagonal elements. In the opposite case (incorrectly mounted instruments), we notice that the magnitudes of the off-diagonal elements are higher compared to the diagonal elements.

A criterion for detection of correctly mounted instruments may thus be estimated from the ratio between the diagonal elements and the off-diagonal elements (D-OD-R) of the cross-covariance matrix R, $$D - OD - R = \frac{\sum |\text{diagonal elements of } R|}{\sum |\text{off-diagonal elements of } R|}$$

where |•| represents the magnitude (or squared magnitude) of individual elements of the cross-covariance matrix R.

For the 3D acceleration sensor, e.g., the ratio (D-OD-R) may be determined as:

$$D - OD - R = \left\langle \frac{|x_L^* x_R| + |y_L^* y_R| + |z_L^* z_R|}{|x_L^* y_R| + |x_L^* z_R| + |y_L^* z_R| + |y_L^* x_R| + |z_L^* x_R| + |z_L^* z_R|} \right\rangle$$

where <•> denotes averaging over time. The ratio may as well be calculated as a difference (Log[SUM(diagonal)]−log[SUM(off-diagonal)]) in the logarithmic domain.

In the case of the two cross-covariance matrices shown in the FIG. 6A, 6B, the ratio in the correctly mounted case becomes 2.85, and the ratio in the off-diagonal case becomes 0.16.

A criterion for detection of correctly mounted instruments may thus be

Hearing instruments are correctly mounted if D-OD-R≥TH1, and

Hearing instruments are in-correctly mounted if D-OD-R<TH2.

TH1 may be larger than or equal to TH2. TH1 may e.g. be larger than or equal to 1, such as larger than or equal to 2, e.g. larger than or equal to 2.5. TH2 may e.g. be smaller than or equal to 1.5, such as smaller than or equal to 1, e.g. smaller than or equal to 0.5.

In an embodiment, the (cross-) covariance matrix is only updated, if a movement is detected (i.e. movement above a certain threshold, e.g. due to head movements, walking, etc.).

Another way to detect if the instruments are not correctly aligned could be to simply subtract the left and the right (possibly filtered) acceleration patterns from each other (as experienced by left and right hearing instruments of a binaural hearing system). This, however, would not detect if the misalignment is due to head movements. On the other hand. If the instruments are correctly mounted, a difference between the measured acceleration patterns may be used to detect head movements.

In the case of stereo audio playback (e.g. in a binaural headset), the detection of correctly mounted instruments may be used to determine if the playback should be either binaural stereo (when correctly mounted) or two mono streams (when incorrectly mounted, e.g. if the headphones are shared between two people).

An estimate of a current feedback path may provide an indication of whether or not, the two hearing instruments are correctly mounted. Alternatively, or additionally, an estimate of the direction of gravity relative to a housing of the hearing aid may provide such indication, assuming that the user wearing the hearing instruments is in an upright position. Although this is the common situation (when the hearing instruments are active), it may not always be the case.

In case own voice may is impinging on the microphones of the hearing instrument(s) from an unexpected direction, it may be an indication that the hearing instrument(s) is/are in-correctly mounted. If it is detected that the instrument(s) is/are not correctly mounted, we would select the correct instrument for own voice pickup (unless the user has taken the instrument off on purpose in order to talk right into the microphone?).

Prior knowledge on which instrument is left and right may be accessible to the hearing aid system (e.g. the controller), In that case deviations from normal acceleration patterns may be identified in the acceleration data in order to determine which instrument is incorrectly mounted.

E.g. head movements will cause opposite sign on the acceleration axes pointing away from the center of the head. If a head movement pattern is detected on one of the instruments, and not on the opposite instrument, it may indicate the incorrectly mounted instrument. The instrument which deviates from the expected acceleration pattern is then incorrectly mounted.

This may in particular be used to verify if a bone conduction instrument is not correctly mounted on its screw, e.g. if it is turned compared to its optimal placement.

Movement patterns (represented by acceleration data) above a certain magnitude (threshold) may be used to provide an indication of whether or not, the two hearing instruments are correctly mounted.

If we only have little movement on both ears (below a threshold), we may accidentally detect that an instrument is incorrectly mounted.

Only if both instruments have little movement (below a threshold), we do not update the detector. The system may e.g. be configured to only update the cross-covariance matrix in case of a sufficiently high amount of movement (above a threshold).

In the case where one instrument is mounted but the other is not, we may have little movement on one of the instruments, but movement on the other instrument. In that case all values of the cross-covariance matrix will be small. This is an indication that one instrument has fallen off (or the user is tapping the other instrument).

Figure 7A:
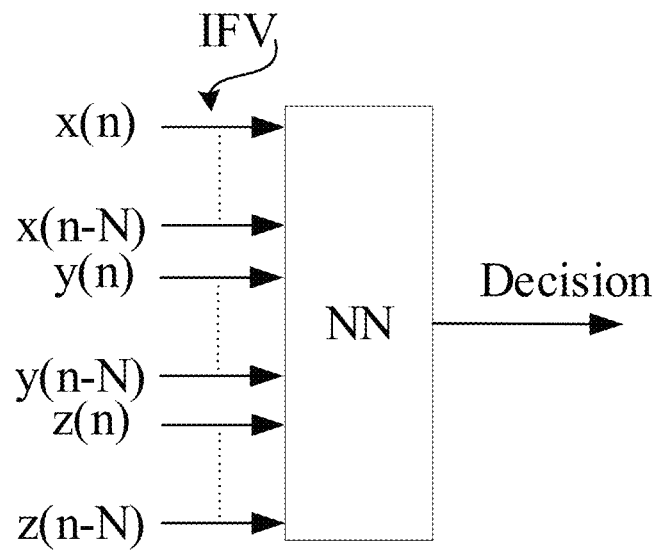
FIG. 7A shows a controller comprising a neural network according to a first embodiment of the present disclosure.

FIG. 7A shows a controller comprising a neural network according to a first embodiment of the present disclosure, wherein the input feature vector (IFV) of the neural network (NN) comprises stacked acceleration inputs (x, y, z) as function of the last N+1 samples.

Figure 7B:
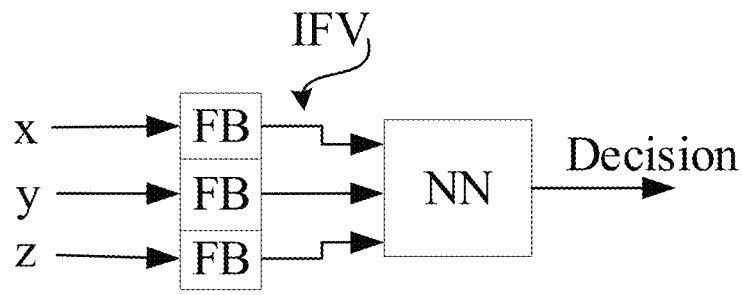
FIG. 7B shows a controller comprising a neural network according to a second embodiment of the present disclosure.

FIG. 7B shows a controller comprising a neural network according to a second embodiment of the present disclosure, wherein the neural network (NN) is of the feed forward—(FF) recurrent—(RNN), or convolutive-type, or a combination thereof. Each of the inputs to the neural network comprises a band-pass filtered version of the acceleration inputs (x, y, z). The elements of the input feature vector may contain one or more bandpass-filtered signals (e.g. implemented by an analysis filter bank (FB)).

Figure 7C:
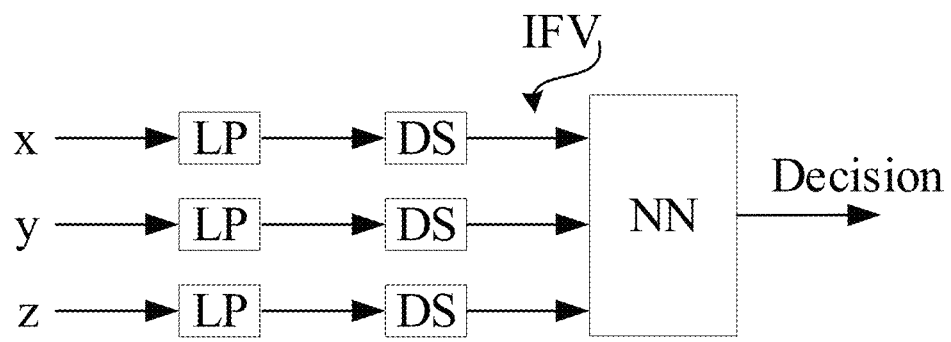
FIG. 7C shows a controller comprising a neural network according to a third embodiment of the present disclosure.

FIG. 7C shows a controller comprising a neural network according to a third embodiment of the present disclosure, wherein each of the inputs to the neural network (NN) comprises a low-pass filtered (LP) and (possibly down-sampled (DS)) version of the acceleration inputs (x, y, z).

Figure 7D:
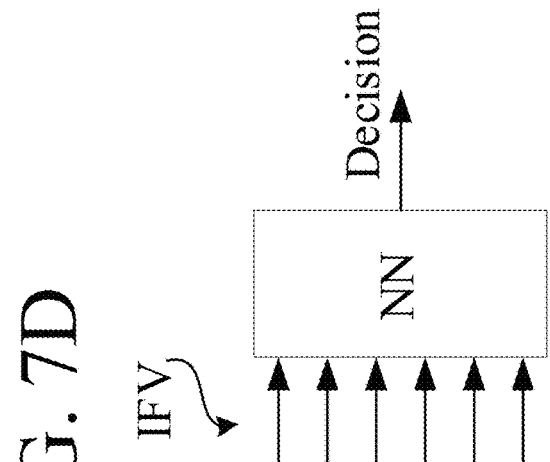
FIG. 7D shows a controller comprising a neural network according to a fourth embodiment of the present disclosure.

FIG. 7D shows a controller comprising a neural network according to a fourth embodiment of the present disclosure with a binaural input, wherein the neural network is a recurrent neural network (RNN), e.g. a gated recurrent unit (GRU), cf. e.g. EPEP4033784A1.

Figure 7F:
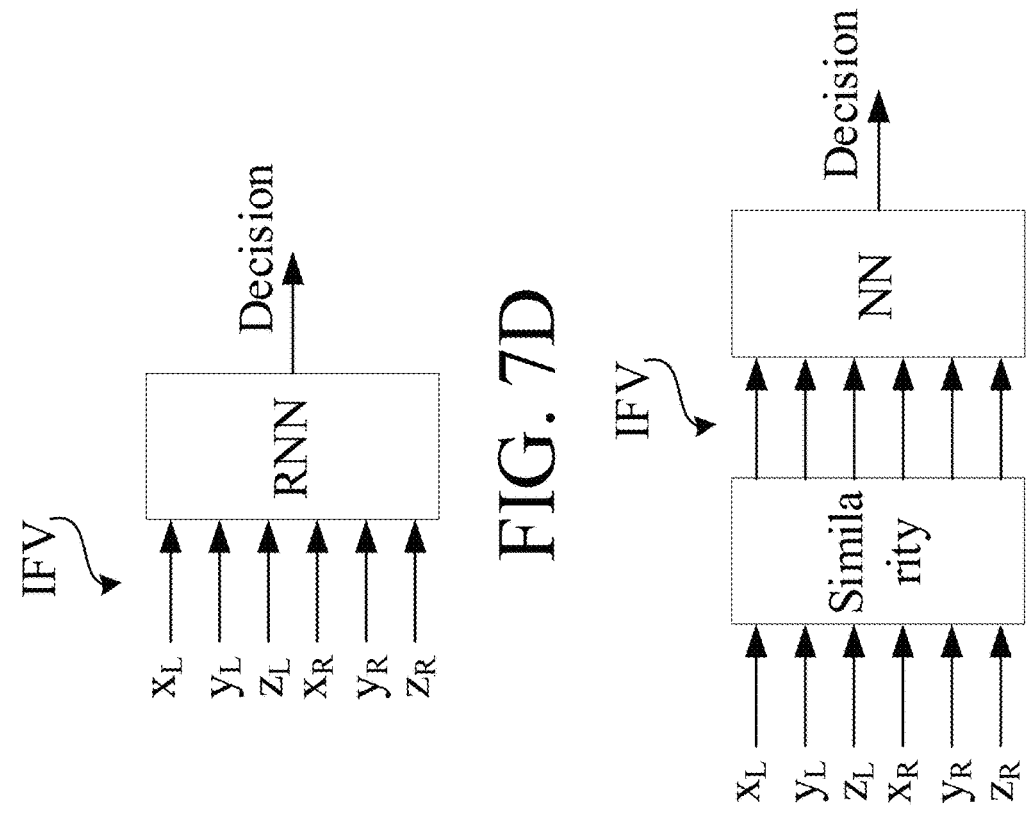
FIG. 7F shows a controller comprising a neural network according to a sixth embodiment of the present disclosure.
Figure 7E:
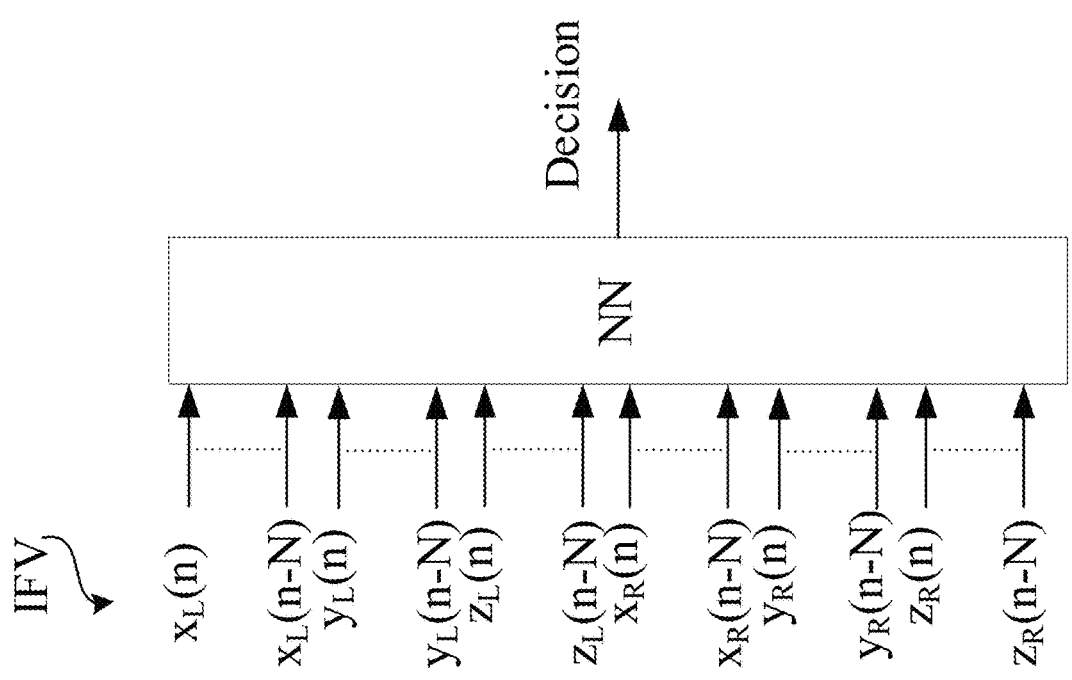
FIG. 7E shows x a controller comprising a neural network according to a fifth embodiment of the present disclosure.

FIG. 7E shows a controller comprising a neural network according to a fifth embodiment of the present disclosure as in FIG. 7A but in a binaural version. The neural network (NN) may e.g. be a feed-forward neural network or a convolutive neural network.

FIG. 7F shows a controller comprising a neural network according to a sixth embodiment of the present disclosure, with a binaural input, wherein input feature vector (IFV) to the neural network (NN) is a similarity measure.

FIG. 7A-7F schematically illustrates different input feature vectors (IFV) for the neural network (NN; RNN) implementing a controller ($CTR_L$, $CTR_R$) configured to detect whether or not the left and/or right hearing instruments are correctly mounted in dependence of a similarity measure (FIG. 7F), e.g. a correlation measure, between acceleration data provided by the left and right hearing instruments, or based on acceleration data directly (FIG. 7A, 7D, 7E), or based on otherwise processed versions of the acceleration data (FIG. 7B, FIG. 7C) provided by the left and/or right hearing instruments.

The input data (e.g. an input feature vector) of the neural network may be constituted by or comprise data for a given time instance (n, e.g. 'now'), cf. e.g. FIG. 7B, 7D, 7F. The input data may e.g. be constituted by or comprise data for a the given time instance (n) and a number (N) of previous time instances, cf. e.g. FIG. 7A, 7E. The latter may be advantageous depending on the type of neural network used (in particular for feed forward-type or convolutional-type neural networks). The 'history' of the data represented by the (N previous time instances may be included in the neural network, e.g. in a recurrent-type neural network, e.g. comprising a GRU, cf. e.g. FIG. 7D (where the neural network is denoted 'RNN'). Alternatively, the (time-) history of the data may be included by low-pass filtering the data (and/or down sampling) before entering the neural network (i.e. the input feature vector—at a given time instance (n)—may comprise lowpass-filtered (and/or down-sampled) acceleration data from x-, y- and z-directions of accelerometers at one or both sides of the ear of the user, cf. e.g. FIG. 7C (where blocks LP indicate low-pass filtering, and blocks DS indicate down-sampling). Thereby the number of computations performed by the neural network can be decreased. The input data may e.g. be time domain signals (e.g. time domain values of acceleration sensors, e.g. provided at successive discrete time instances ( . . . , n−1, n, n+1 . . . )) The input data my, however, be transformed to a transform domain before being input to the neural network. The transform domain may e.g. be the frequency domain, cf. e.g. FIG. 7B, where each of the data inputs (x, y, z) comprise an analysis filter bank (FB). The input data (x, y, z) may e.g. represent current accelerometer data for x-, y- and z-directions of a given hearing device (e.g. relative to a direction of the force of gravity of the earth).

The output of the neural network is denoted 'Decision' in the exemplary configurations of FIG. 7A-7F. The output may e.g. comprise a similarity measure based on input data from both sides of the head of the user (e.g. from accelerometer data from both hearing instruments of a binaural hearing aid system). The output of the neural network may e.g. comprise an indicator of whether or not the hearing instrument at a given ear is correctly mounted (e.g. from accelerometer data from one or both hearing instruments of a binaural hearing aid system). The output of the neural network may e.g. comprise an indicator of whether or not a given one of the hearing instruments is correctly mounted (e.g. from accelerometer data from both hearing instruments of a binaural hearing aid system).

Instead of labelling the output of the neural network 'decision', it might as well have been labeled "classification", which eventually leads to a decision.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

US2013188796A1 (Oticon) 25 Jul. 2013
EP3370435A1 (Oticon) 5 Sep. 2018
EPEP4033784A1 (Oticon) 27 Jul. 2022

The invention claimed is:

1. A binaural hearing aid system comprising left and right hearing instruments adapted to be located at or in left and right ears, respectively, of a user, each of the left and right hearing instruments comprising a BTE-part configured to be located at or behind an outer ear of the user, the BTE-part comprising a housing;
an acceleration sensor configured to measure acceleration in at least two directions relative to the housing of the BTE-part and to provide acceleration data indicative thereof;
at least a first one of the left and right hearing instruments comprising a transmitter being configured to allow transmission of acceleration data from the acceleration sensor to the second one of the left and right hearing instruments, and
at least a second one of the left and right hearing instruments comprising a receiver being configured to allow reception of the acceleration data from the acceleration sensor of the first one of the left and right hearing instruments, wherein
at least the second one of the left and right hearing instruments comprising a controller configured to detect whether or not the left and right hearing instruments are correctly mounted in dependence of a similarity measure between said acceleration data provided by the left and right hearing instruments, wherein
the controller is configured to base the decision of whether or not the left and right hearing instruments are correctly mounted on an estimated cross-covariance matrix obtained from the outer product of the acceleration signals from the left and right hearing instruments, respectively.

2. A binaural hearing aid system according to claim 1 wherein the similarity measure is constituted by or comprises a correlation measure.

3. A binaural hearing aid system according to claim 1 wherein the acceleration data of each of the left and right hearing instruments comprises acceleration data representing the at least two directions.

4. A binaural hearing aid system according to claim 1 wherein the controller is configured to decide that the hearing instruments are correctly mounted when the magnitude of the diagonal elements of the cross-covariance matrix are larger than a threshold value.

5. A binaural hearing aid system according to claim 1 wherein the controller is configured to decide that the hearing instruments are in-correctly mounted when at least one, or at least two, of the off-diagonal elements is (are) relatively high, and the diagonal elements at the same time have relatively low values.

6. A binaural hearing aid system according to claim 1 wherein the controller is configured to decide that the hearing instruments are in-correctly mounted when at least one, or at least two, of the off-diagonal elements is (are) larger than a threshold value, and the diagonal elements at the same time are smaller than a threshold value.

7. A binaural hearing aid system according to claim 1 wherein the controller comprises a neural network configured to detect an incorrect mounting of the hearing instruments.

8. A binaural hearing aid system according to claim 7 wherein the neural network is configured to receive acceleration data from the left and right hearing instruments as input features, or elements of a cross-covariance matrix of the acceleration data or otherwise processed versions of the acceleration data from the left and right hearing instruments.

9. A binaural hearing aid system according to claim 1 wherein the controller comprises a neural network wherein at least some of the layers are implemented as a recurrent neural network.

10. A binaural hearing aid system according to claim 1 configured to trigger a warning of the user in case it is detected that the left and/or right hearing instruments is/are not correctly mounted.

11. A binaural hearing aid system according to claim 1 configured to disable a directional noise reduction algorithm of the left and right hearing instruments in case it is detected that the left and/or right hearing instruments is/are not correctly mounted.

12. A binaural hearing aid system according to claim 1 configured to provide that the detection of whether the left and right hearing instruments are correctly mounted is dependent on other input features than said acceleration data.

13. A binaural hearing aid system according to claim 2 configured to provide that correlation between the acceleration data provided by the left and the right instruments is maximum when at least one direction relative to the housing of the BTE-parts of the respective left and right hearing instruments are parallel.

14. A binaural hearing aid system according to claim 1 wherein at least one of the left and right hearing instruments comprises a predefined reference position representing a correctly mounted hearing instrument, and wherein the binaural hearing aid system is configured to provide that the detection of whether the left and right hearing instruments are correctly mounted is dependent on said reference position.

15. A binaural hearing aid system according to claim 1 wherein at last one of the left and right hearing instruments is constituted by or comprises an air-conduction type hearing aid, a bone-conduction type hearing aid, a cochlear implant type hearing aid, or a combination thereof.

16. A binaural hearing aid system comprising left and right hearing instruments adapted to be located at or in left and right ears, respectively, of a user, each of the left and right hearing instruments comprising:
a BTE-part configured to be located at or behind an outer ear of the user, the BTE-part comprising a housing;
an acceleration sensor configured to measure acceleration in at least two directions relative to the housing of the BTE-part and to provide acceleration data indicative thereof;
at least a first one of the left and right hearing instruments comprising a transmitter being configured to allow transmission of acceleration data from the acceleration sensor to the second one of the left and right hearing instruments, and
at least a second one of the left and right hearing instruments comprising a receiver being configured to allow reception of the acceleration data from the acceleration sensor of the first one of the left and right hearing instruments,
wherein
at least the second one of the left and right hearing instruments comprising a controller configured to detect whether or not the left and right hearing instruments are correctly mounted in dependence of a similarity measure between said acceleration data provided by the left and right hearing instruments, and wherein
the system is configured to provide that the detection of whether the left and right hearing instruments are correctly mounted is dependent on other input features than said acceleration data, said system being configured to provide that the detection of whether the left and right hearing instruments are correctly mounted is dependent on the detection of a changed feedback path estimate.

17. A binaural hearing aid system comprising left and right hearing instruments adapted to be located at or in left and right ears, respectively, of a user, each of the left and right hearing instruments comprising:
a BTE-part configured to be located at or behind an outer ear of the user, the BTE-part comprising a housing;
an acceleration sensor configured to measure acceleration in at least two directions relative to the housing of the BTE-part and to provide acceleration data indicative thereof;
at least a first one of the left and right hearing instruments comprising a transmitter being configured to allow transmission of acceleration data from the acceleration sensor to the second one of the left and right hearing instruments, and at least a second one of the left and right hearing instruments comprising a receiver being configured to allow reception of the acceleration data from the acceleration sensor of the first one of the left and right hearing instruments, wherein at least the second one of the left and right hearing instruments comprising a controller configured to detect whether or not the left and right hearing instruments are correctly mounted in dependence of a similarity measure between said acceleration data provided by the left and right hearing instruments, wherein the similarity measure is constituted by or comprises a correlation measure, and wherein the system is configured to average the covariance between the acceleration data provided by the left and the right instruments across time based only on samples in which acceleration above a certain threshold has been detected.

18. A method of operating a binaural hearing aid system comprising left and right hearing instruments adapted to be located at or in left and right ears, respectively, of a user, each of the left and right hearing instruments comprising:

a BTE-part configured to be located at or behind an outer ear of the user, the BTE-part comprising:

a housing; and an acceleration sensor configured to measure acceleration in at least two directions relative to the housing of the BTE-part;

the method comprising:

provide by said acceleration sensor acceleration data indicative of a current acceleration in said at least two directions;

transmitting by at least a first one of the left and right hearing instruments acceleration data from the acceleration sensor to the second one of the left and right hearing instruments, and receiving by at least a second one of the left and right hearing instruments the acceleration data from the acceleration sensor transmitted by the first one of the left and right hearing instruments, determining a similarity measure between said acceleration data provided by the left and right hearing instruments; and detecting by the at least the second one of the left and right hearing instruments whether or not the left and right hearing instruments are correctly mounted in dependence of said similarity measure, wherein the decision of whether or not the left and right hearing instruments are correctly mounted is based on an estimated cross-covariance matrix obtained from the outer product of the acceleration signals from the left and right hearing instruments, respectively.

19. A non-transitory computer readable medium storing a computer program comprising instructions which, when the program is executed by a computer, cause the computer to carry out the method of claim 18.

* * * * *